United States Patent [19]

Matsushima

[11] Patent Number: 5,083,377
[45] Date of Patent: Jan. 28, 1992

[54] CONTROL METHOD OF SHEET-DRIVEN TYPE AUTOMATIC DRAFTING MACHINE

[75] Inventor: Toshiaki Matsushima, Tokyo, Japan

[73] Assignee: Mutoh Industries Ltd., Tokyo, Japan

[21] Appl. No.: 545,897

[22] Filed: Jun. 29, 1990

[30] Foreign Application Priority Data

Sep. 28, 1989 [JP] Japan .................. 1-253585

[51] Int. Cl.$^5$ .................... B43L 13/00; B41J 2/005
[52] U.S. Cl. ........................ 33/18.1; 33/18.2;
 101/424.1; 346/1.1; 346/25
[58] Field of Search ............ 33/18.1, 18.2, 34, 38,
 33/39.1; 101/424.1, 484; 346/140 R, 25, 1.1

[56] References Cited

U.S. PATENT DOCUMENTS

| | | | |
|---|---|---|---|
| 4,455,751 | 6/1984 | Held | 33/18.1 |
| 4,469,026 | 9/1984 | Irwin | 346/25 |
| 4,528,754 | 7/1985 | Houldsworth | 33/18.1 |
| 4,707,211 | 11/1987 | Shibata | 346/25 |
| 4,728,963 | 3/1988 | Rasmussen et al. | 346/25 |
| 4,784,714 | 11/1988 | Shibata | 346/25 |
| 4,882,992 | 11/1989 | Schmoeger | 101/424.1 |
| 4,931,810 | 6/1990 | Iwata et al. | 346/1.1 |
| 4,943,816 | 7/1990 | Sporer | 346/25 |

FOREIGN PATENT DOCUMENTS 249398 10/1989 Japan .................. 33/18.2

Primary Examiner—William A. Cuchlinski, Jr.
Assistant Examiner—C. W. Fulton
Attorney, Agent, or Firm—Wenderoth, Lind & Ponack

[57] ABSTRACT

A control method controls a sheet-driven type automatic drafting machine to allow for drying of an inking medium disposed on a drafting sheet. The automatic drafting machine is of a type which includes a platen upon which a drafting sheet is conveyed in a feed direction and a line-drafting head which is conveyed in a line direction perpendicular to the feed direction. The line-drafting head is adapted to accommodate at least one writing instrument from among a plurality of writing instruments located in a stocker. The control method includes a step of storing in a memory a drying time associated with the inking medium of each of the plurality of writing instruments, a step of determining which of the plurality of the writing instruments is accommodated by the line-drafting head, a step of reading from the memory a drying time associated with the one of the plurality of the writing instruments accommodated by the line-drafting head, and a step of controlling the conveyance in the feed direction of the drafting sheet in accordance with the thus read drying time. The identity of each writing instrument is determined by either sensing an identification mark on the writing instrument or by referencing a location of the writing instrument within the stocker.

10 Claims, 4 Drawing Sheets

FIG. 2(a)

| PEN TYPE | DRYING TIME (MINUTE) |
|---|---|
| INK PEN | 20 |
| CERAMIC PEN | 10 |
| OILY BALL PEN | 5 |
| WATER BALL PEN | 5 |
| FIBER PEN | 3 |
| PENCIL | 0 |

FIG. 2(b)

| PEN No. | DRYING TIME (MINUTE) |
|---|---|
| No. 1 | 30 |
| No. 2 | 0 |
| No. 3 | 5 |
| ⋮ | ⋮ |

CONTROL METHOD OF SHEET-DRIVEN TYPE AUTOMATIC DRAFTING MACHINE

BACKGROUND OF THE INVENTION

The present invention relates to a control method for drying drafted ink in a sheet-driven type automatic drafting machine.

The prior art is currently devoid of an automatic drafting machine which functions to maintain a waiting state until the ink on a take-up roll sheet has dried, in which such a function is installed or provided in a control mechanism of the automatic drawing or drafting machine.

In the absence of such a function for determining the ink drying time in the controller of the drafting machine mentioned above, the waiting time in which ink drafted on the sheet is dried must be set in the host computer of the machine. Such an arrangement is disadvantageous in that the drafting data cannot be transferred from the host computer to the controller of the automatic drafting machine until the waiting time for drying ink is determined.

It is the purpose of the present invention to provide an automatic drafting machine in which the above shortcoming is obviated.

DESCRIPTION OF THE DRAWINGS

FIGS. 2(a) and 2(b) are tables depicting pen drying times.

DESCRIPTION OF THE PREFERRED EMBODIMENT

The preferred embodiment of the drafting machine according to the present invention will be described with reference to the accompanying drawings.

Figure 3:
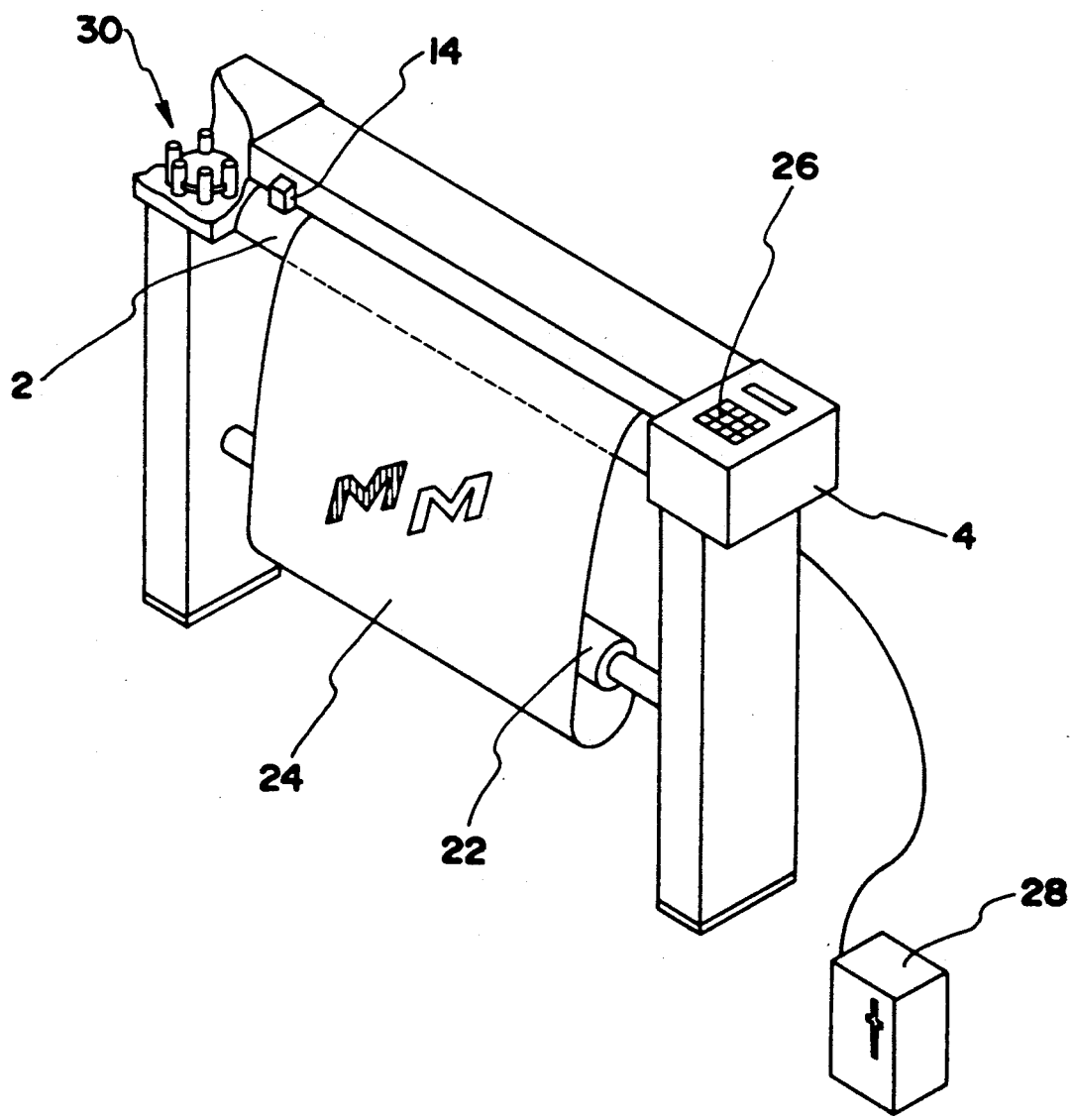
FIG. 3 is a perspective view of the automatic drafting machine.
Figure 4:
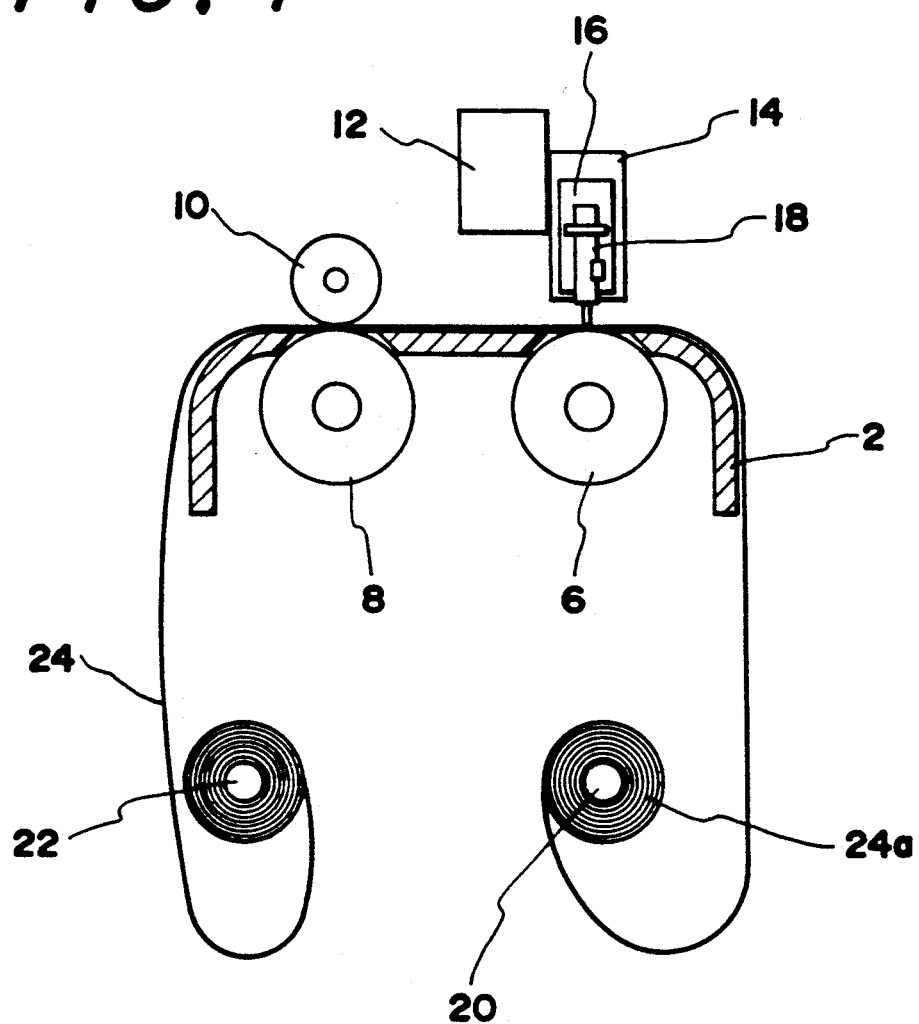
FIG. 4 is a side elevation view of the machine shown in FIG. 3.

Referring first to FIGS. 3 and 4, a platen 2 is secured to a part 4 of the sheet-driven type automatic drafting machine and has two grooves formed therein. In these grooves, a drafting roller 6 and a driving roller 8 are rotatably situated and secured. The grooves extend in longitudinal directions of the platen 2 in parallel to each other as shown. The rollers 6 and 8 are rotatably journaled to a bracket (not shown) secured to the machine part 4. The rollers 6 and 8 mutually cooperate to rotate in the same direction at substantially the same peripheral speed by means of an X motor (not shown). A pressing roller 10 is pressed toward the driving roller 8 in response to the influence of a spring mechanism (not shown).

A Y rail 12 is secured between the side portions of the machine part 4, and a line-drafting head 14 is (not shown) installed so as to move along the Y rail 12. A pen holder 16 cooperating with an elevating mechanism installed within the line-drafting head 14 removably holds a writing tool or instrument 18, such as an ink pen. The line-drafting head 14 is adapted to be constructed so as to move controllably along the Y rail 12. The machine part 4 has a sheet supply shaft 20 and a sheet taking-up shaft 22 which are respectively rotatable by a motor (not shown) operatively connected thereto. A roll portion 24a of the roll sheet 24 is supported removably on the sheet supply shaft 20. A part of the roll sheet 24 taken-up from the roll portion 24a is adapted to be taken-up around the sheet take-up shaft 22 through the platen 2. The machine part 4 has therein a controller consisting of a calculator. Connected to the controller are the XY motors, a drive device for the elevating mechanism contained in the line-drafting head 14, a motor for driving the sheet supply shaft 20 and the sheet taking-up shaft 22, a drive motor for a writing instrument stocker 30 which will be described, and a sensor 32 (shown in FIG. 5). Respective tools and mechanisms mentioned above are adapted to be controlled by the controller. The machine part 4 has an operating panel 26 connected to the controller. As shown in FIG. 3, a host computer 28 supplies drafting data and various drafting commands to the controller. The machine part 4 has a known type writing instrument stocker 30 of a rotary type for holding the writing instruments consisting of a plurality of ink pens. Each pen holder of the plural pen holders in the stocker 30 and the pen holder 16 of the line-drafting head 14 are adapted to automatically change the writing or drafting instrument in these holders. The construction of the automatic drafting instrument changer is well-known and is not the gist of the present invention, and as such the construction thereof will not be depicted and explained in detail hereinafter.

Figure 5:
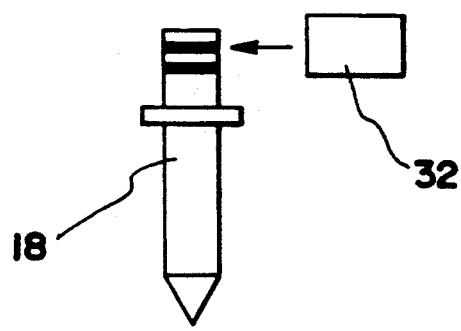
FIG. 5 depicts a pen used in the automatic drafting machine.

As shown in FIG. 5, the pen holder 14 includes a sensor 32 for sensing or reading the type of the drafting instrument 18 held in the pen holder 16 of the pen head 14 on the basis of a mark provided on the drafting instrument 18. The drafting instrument 18 may be an ink pen, ceramic pen, oil ball pen, water ball pen, fiber pen, or pencil. The drying time of ink drafted on the roll paper sheet is determined according to the kind of ink used. The controller provided on the side portion of the machine part 4 includes a table of the particular ink drying times associated with each kind of ink of the various drafting instrument (see FIG. 2). The ink drying time table may be in one of two forms: one in which the identification marks on the drafting instruments are referenced, and the other in which assigned drafting instrument numbers are referenced. The assigned number of the drafting instrument is determined by setting the number of a pen holder located at the particular position in the drafting instrument stocker 30 as No. 1. Using the No. 1 pen holder as a reference, sequential numbers of No. 2, No. 3, . . . are applied to the pen holders in the stocker 30 according to the rotation direction of the stocker 30. That is, the No. 1 drafting instrument is that held in the No. 1 pen holder. The particular drafting instrument to be pulled out or the particular pen holder holding the particular instrument of the stocker 30 is determined according to a command of the transferred drafting data. The controller recognizes the number of the drafting instrument held in the pen head 14 based on the command.

The tables shown in FIGS. 2(a) and 2(b) respectively depict examples of the type and assigned number of the drafting instruments and the respective ink drying times suitable for the various inks of the drafting instruments.

Figure 1:
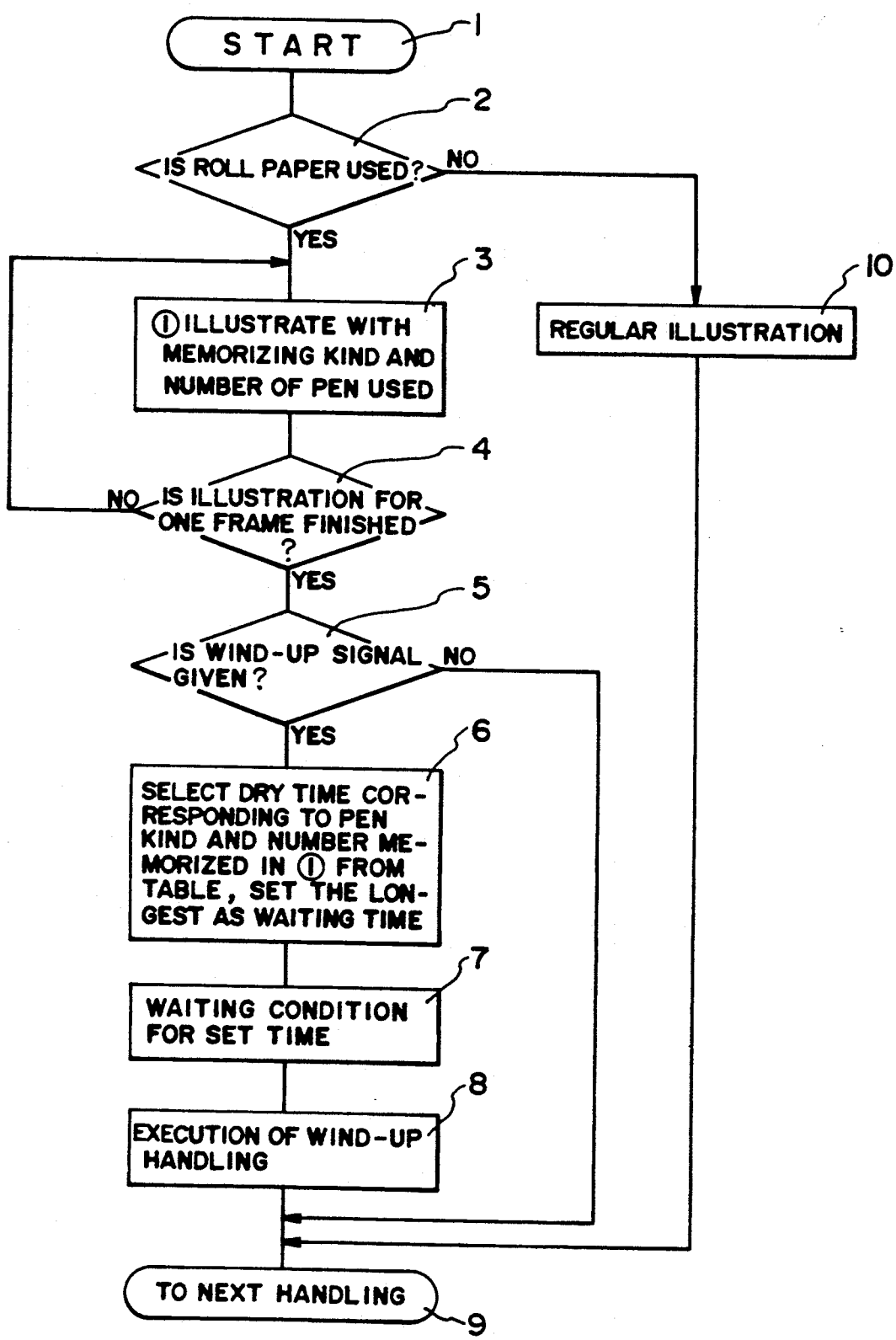
FIG. 1 is a flow chart of the operational control of the sheet-driven type automatic drafting machine of the present invention.

The operation of the automatic drafting machine will now be described with reference to FIG. 1.

When drafting is carried out, the rolled-out portion of the roll sheet 24 is placed on the platen 2 and the rolled-out portion is inserted between the drive roller 8 and the press roller 10 to be secured stably between the rollers. After the setting of the rolled-out portion of the roll sheet 24 on the platen 2, the drafting operation or process of the automatic drafting machine starts from the Step 1 shown in the flow chart of FIG. 1. The controller of the automatic drafting machine first determines at Step 2 whether or not the roll paper is to be used for drafting. When the roll sheet is to be used for drafting, the type or assigned number of the drafting instrument 18 held by the line-drafting head 14 is recognized as described above according to the output of the sensor 32 or according to the command of the drafting data, and the drafting instrument type or number is stored in a memory at Step 3. Then the drive roller 8 and the drafting roller 6 are controlled to rotate in the same direction and the line-drafting head 14 is controlled to move along the Y rail 12. In addition, the drafting instrument 18 is controlled to rise or descend. As a consequence, the rolled-out portion of the roll sheet 24 on the platen 2 is conveyed along the front-and-rear direction of the machine part 4 and the drafting head 14 is conveyed along a direction which is perpendicular to the feed direction of the rolled-out portion of the roll paper 24, thereby executing a predetermined drafting of one frame on the rolled-out portion of the roll sheet 24 on the platen 2. At Step 4, a determination is made as to whether or not drafting of one frame is complete. When drafting of one frame is deemed complete, the controller determines whether or not the roll take-up commands is present in the command from the host computer at Step 5. When the take-up command is present, the ink drying time is read from the tables shown in FIG. 2 according to the drafting instrument type or number stored at Step 3. The ink drying time thus read is set as a waiting time. Next, at Step 7, the controller keeps the automatic drafting machine in a waiting state for the waiting time duration set at Step 6. In the waiting state, the controller carries out other operations. When the ink drying time (i.e. waiting time) elapses, the controller drives the motors for the shafts 20 and 22 at Step 8 to rotate the sheet supply shaft 20 and the sheet taking-up shaft 22. As a consequence, one frame part of the roll paper sheet 24 is taken up on the sheet take-up shaft 22. Next, at Step 9, the controller executes a drafting operation for the next frame. When the determination result of Step 2 is negative, the operation proceeds to Step 10 for regular drafting, then to Step 9.

As described above in detail, the controller of the automatic drafting machine previously stores the ink drying times corresponding to the type or assigned number of each respective drafting instrument. As such, it is possible to automatically set a sheet take-up waiting time that is suitable to effectively dry the ink on the sheet according to the type or assigned number of the drafting instrument used, thus preventing ink stains on the paper sheet. In addition, because the controller of the automatic drafting machine functions to set the sheet take-up waiting time in which the ink dries, the load on the host computer is small. Further, because it is possible to transfer data from the host computer to the controller of the automatic drafting machine during the waiting time, the total time length of the drafting operation in the drafting machine is substantially reduced.

What is claimed is:

1. A method of controlling a sheet-driving type automatic drafting machine, the automatic drafting machine including a platen upon which a drafting sheet is conveyed in a feed direction and a line-drafting head which is conveyed in a line direction which is perpendicular the feed direction, the line-drafting head being adapted to accommodate at least one writing instrument from among a plurality of writing instruments, each of the plurality of writing instruments including an inking medium, said method comprising:
    a step of storing in a memory a drying time associated with each of the plurality of writing instruments, wherein each drying time is determined according to the inking medium of each of the plurality of writing instruments;
    a step of determining which one of the plurality of writing instruments is accommodated by the line-drafting head to be used for disposing an inking medium on the drafting sheet;
    a step of reading from the memory a drying time associated with the one of the plurality of writing instruments determined in said determining step; and,
    a step of controlling a conveyance in the feed direction of the drafting sheet in accordance with the drying time read in said reading step.

2. A method as recited in claim 1, wherein said controlling step includes:
    a step of causing the automatic drafting machine to enter a waiting stat for a time duration corresponding to the drying time read in said reading step, the waiting state being characterized in that conveyance of the drafting sheet in the feed direction is restricted to thereby permit an inking medium disposed on the drafting sheet to dry.

3. A method as recited in claim 1, wherein said determining step includes:
    a step of sensing an identification mark located on the one of the plurality of writing instruments accommodated by the line drafting head, the identification mark denoting a type of inking medium of a corresponding writing instrument.

4. A method as recited in claim 2, wherein said determining step includes:
    a step of sensing an identification mark located on the one of the plurality of writing instruments accommodated by the line drafting head, the identification mark denoting a type of inking medium of a corresponding writing instrument.

5. A method as recited in claim 1, wherein the automatic drafting machine further includes a stocker having a plurality of pen holder positions for respectively holding the plurality of writing instruments, and wherein said determining step includes:
    a step of assigning a respective pen holder number to each of the plurality of pen holder positions of the stocker; and,
    a step of identifying the pen holder number of a pen hold position which holds the one of the plurality of writing instruments accommodated by the line-drafting head.

6. A method as recited in claim 2, wherein the automatic drafting machine further includes a stocker having a plurality of pen holder positions for respectively holding the plurality of writing instruments, and wherein said determining step includes:

a step of assigning a respective pen holder number to each of the plurality of pen holder positions of the stocker; and, a step of identifying the pen holder number of a pen hold position which holds the one of the plurality of writing instruments accommodated by the line-drafting head.

7. A method as recited in claim 3, wherein said storing step includes:

forming a data table in the memory denoting each type of inking medium and respective ink drying times.

8. A method as recited in claim 4, wherein said storing step includes:

forming a data table in the memory denoting each type of inking medium and respective ink drying times.

9. A method as recited in claim 5, wherein said storing step includes:

forming a data table in the memory denoting each pen holder number and respective ink drying times.

10. A method as recited in claim 6, wherein said storing step includes:

forming a data table in the memory denoting each pen holder number and respective ink drying times.

* * * * *